United States Patent
Zhang et al.

(10) Patent No.: US 11,062,030 B2
(45) Date of Patent: Jul. 13, 2021

(54) SYSTEMS AND METHODS FOR MANAGING ACCESS CONTROL BETWEEN PROCESSES IN A COMPUTING DEVICE

(71) Applicant: Huawei Technologies Co., Ltd., Shenzhen (CN)

(72) Inventors: Tianhu Zhang, Waterloo (CA); Alan Pak-Lun Ho, Unionville (CA); Anthony Russello, Hamilton (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 514 days.

(21) Appl. No.: 15/916,866

(22) Filed: Mar. 9, 2018

(65) Prior Publication Data

US 2019/0278910 A1 Sep. 12, 2019

(51) Int. Cl.
*G06F 21/57* (2013.01)
*G06F 9/54* (2006.01)

(52) U.S. Cl.
CPC .............. *G06F 21/57* (2013.01); *G06F 9/54* (2013.01); *G06F 2221/034* (2013.01)

(58) Field of Classification Search
CPC ....... G06F 21/57; G06F 9/54; G06F 2221/034
USPC .......................................................... 726/1
See application file for complete search history.

(56) References Cited

U.S. PATENT DOCUMENTS

| | | | |
|---|---|---|---|
| 5,437,031 A | 7/1995 | Kitami | |
| 7,865,934 B2 * | 1/2011 | Wobber | G06F 21/6281 726/2 |
| 7,882,317 B2 * | 2/2011 | Hunt | G06F 21/57 711/163 |
| 8,726,294 B2 * | 5/2014 | Benedek | G06F 9/54 719/313 |
| 9,560,028 B1 * | 1/2017 | Salehpour | H04L 63/08 |
| 2004/0199763 A1 * | 10/2004 | Freund | H04L 63/104 713/154 |
| 2005/0182966 A1 | 8/2005 | Pham et al. | |
| 2010/0121927 A1 * | 5/2010 | Zhang | G06F 9/468 709/206 |
| 2013/0268997 A1 * | 10/2013 | Clancy, III | H04L 63/0227 726/1 |
| 2014/0051432 A1 * | 2/2014 | Gupta | H04L 63/1466 455/425 |
| 2014/0059357 A1 * | 2/2014 | Andersson | G06F 21/602 713/189 |
| 2014/0201807 A1 * | 7/2014 | White | G06F 21/577 726/1 |

(Continued)

FOREIGN PATENT DOCUMENTS

| | | |
|---|---|---|
| CN | 103379089 A | 10/2013 |
| CN | 104205114 A | 12/2014 |
| WO | 2015138931 A1 | 9/2015 |

OTHER PUBLICATIONS

Android Intent Firewall, retrieved on May 28, 2018 from http://www.cis.syr.edu/~wedu/android/IntentFirewall/.

*Primary Examiner* — Dereena T Cattungal
(74) *Attorney, Agent, or Firm* — Slater Matsil, LLP (57) ABSTRACT

Methods and systems for managing access control of interprocess communications between processes executing on a computing device are provided. Interprocess communication is determined to be permitted or denied based on calling process attribute data, target process attribute data, IPC attribute data, and contextual attribute data of an operating system, and one or more access policies.

19 Claims, 5 Drawing Sheets

(56) References Cited

U.S. PATENT DOCUMENTS

| | | | |
|---|---|---|---|
| 2015/0347200 A1* | 12/2015 | Fadel | G06F 9/54 |
| | | | 719/319 |
| 2015/0347743 A1* | 12/2015 | Magee | G06F 9/468 |
| | | | 726/21 |
| 2017/0359279 A1* | 12/2017 | Peterson | H04W 4/12 |
| 2019/0081983 A1* | 3/2019 | Teal | H04L 63/14 |

* cited by examiner

SYSTEMS AND METHODS FOR MANAGING ACCESS CONTROL BETWEEN PROCESSES IN A COMPUTING DEVICE

FIELD

This application relates to access control between processes, and in particular to managing access control of communications between processes executing on a computing device.

BACKGROUND

Computing devices are growing increasingly ubiquitous. Modern computing devices include operating systems and can execute numerous applications and services in parallel. In some operating systems, such as the Android™ operating system, a process may communicate with another process to request that the other process perform an action, such as accessing resources or sending messages to or from other processes. For example, a messaging application (e.g. WhatsApp™) may make use of a camera application on a computing device, or may display an alert notification on the display of the computing device when a message is received, even if a different application is running. Such communication may provide greater functionality and versatility to a process.

However, allowing processes to communicate with each other may present a security risk to the computing device in certain situations or contexts. For example, a malicious application may attempt to communicate with a telephone application of a computing device to access audio data from the telephone application to listen to a phone call. Improvements to access control for communications between processes executing on a computing device are therefore desirable.

SUMMARY

According to one aspect of the invention, there is provided a method of managing access control of interprocess communications between processes executing on a computing device. The method includes receiving, by an access control system of an operating system executing on the computing device, an interprocess communication from a calling process, receiving, by the access control system, an identifier of a calling process for the interprocess communication and a target process for the interprocess communication; obtaining, by the access control system, interprocess communication metadata based on the identifier of the calling process and the identifier of a target process, obtaining, by the access control system, contextual attribute data for the operating system; determining, by the access control system, based on the interprocess communication metadata and the contextual attribute data, whether the interprocess communication is permitted; and sending, by the access control system, a message indicating whether the interprocess communication is permitted.

In any of the preceding embodiments, sending comprises sending a permit message indicating that processing of the IPC is permitted after determining that the interprocess communication is permitted.

In any of the preceding embodiments, sending comprises sending a deny message indicating that processing of the IPC is not permitted after determining that the interprocess communication is not permitted.

In any of the preceding embodiments, the contextual attribute data for the operating system is data representative of at least contextual attribute of the operating system that is determined from a state of the operating system.

In any of the preceding embodiments, the interprocess communication metadata includes calling process attribute data for the calling process, target process attribute data for the target process, and IPC attribute data for the IPC.

In any of the preceding embodiments, obtaining IPC metadata comprises obtaining IPC metadata for a pre-authorization check and IPC metadata for a policy check, and wherein determining, by the access control system, whether the interprocess communication is permitted comprises performing an access control check comprising a pre-authorization check and a policy check.

In any of the preceding embodiment, the policy check of the access control check is performed by comparing the interprocess communication metadata for the policy check and the contextual attribute data to one or more access policies, determining whether the interprocess communication metadata and the contextual attribute data match one of the one or more access policies, and sending a permit message indicating that processing of the IPC is permitted after determining that the interprocess communication metadata and the contextual attribute data match one of the one or more access policies.

In any of the preceding embodiments, the pre-authorization check is performed by determining, based on the IPC metadata for pre-authorization whether at least one of the calling process and the target process is a pre-authorized process, and sending, after determining that at least one of the calling process and the target process is a pre-authorized process, a permit message indicating that processing of the IPC is permitted.

In any of the preceding embodiments, determining, based on the IPC metadata for pre-authorization whether at least one of the calling process and the target process is a pre-authorized process comprises determining whether at least one of calling process and the target process comprises a criterion indicating that the at least one of the calling process and the target process is a pre-authorized processes.

In any of the preceding embodiments, the method further includes receiving, by the access control system, an instruction to update one or more of the one or more access policies; and updating, by the access control system, the one or more of the one or more access policies based on the instruction.

According to another aspect of the invention, there is provided a computing device comprising: a processor; a memory communicatively coupled to the processor, the memory having stored thereon processor-executable instructions that, when executed by the processor, cause the processor to: execute an operating system including an access control system to: receive an interprocess communication from a calling process executing on the computing device; receive an identifier of the calling process and an identifier of a target process for the interprocess communication; obtain interprocess communication metadata based on the identifier of the calling process and an identifier of a target process and contextual attribute data of the operating system; determine based on the interprocess communication metadata and contextual attribute data for the operating system and the contextual attribute data whether the interprocess communication is permitted; and send a message indicating whether the interprocess communication is permitted.

In any of the preceding embodiments, the processor-executable instructions, when executed by the processor, cause the processor to send a permit message indicating that processing of the IPC is permitted after a determination that the interprocess communication is permitted.

In any of the preceding embodiments, wherein the processor-executable instructions, when executed by the processor, cause the processor to send a deny message indicating that processing of the IPC is not permitted after a determination that the interprocess communication is not permitted.

In any of the preceding embodiments, the contextual attribute data for the operating system is data representative of at least contextual attribute of the operating system, and wherein the at least one contextual attribute is information determined from a state of the operating system.

In any of the preceding embodiments, the interprocess communication metadata comprises calling process attribute data for the calling process, target process attribute data for the target process, and IPC attribute data for the IPC.

In any of the preceding embodiments, the processor-executable instructions, when executed by the processor, cause the processor to obtain IPC metadata by obtaining IPC metadata for a pre-authorization check and IPC metadata for a policy check, and to determine whether the interprocess communication is permitted by performing an access control check comprising a pre-authorization check and a policy check.

In any of the preceding embodiments, the processor-executable instructions, when executed by the processor, cause the processor to perform the policy check of the access control check by comparing the interprocess communication metadata for the policy check and the contextual attribute data to one or more access policies, to determine whether the interprocess communication metadata and the contextual attribute data match one of the one or more access policies, and to send a permit message indicating that processing of the IPC is permitted after determining that the interprocess communication metadata and the contextual attribute data match one of the one or more access policies.

In any of the preceding embodiments, the processor-executable instructions, when executed by the processor, cause the processor to perform the pre-authorization check by determining, based on the IPC metadata for pre-authorization whether at least one of the calling process and the target process is a pre-authorized process, and to send, after determining that at least one of the calling process and the target process is a pre-authorized process, a permit message indicating that processing of the IPC is permitted.

In any of the preceding embodiments, the processor-executable instructions, when executed by the processor, cause the processor to determine, based on the IPC metadata for pre-authorization whether at least one of the calling process and the target process is a pre-authorized process by determining whether at least one of calling process and the target process comprises a criterion indicating that the at least one of the calling process and the target process is a pre-authorized processes.

In any of the preceding embodiments, the processor-executable instructions, when executed by the processor, cause the processor to: receive an instruction to update one or more of the one or more access policies; and update, the one or more of the one or more access policies based on the instruction.

BRIEF DESCRIPTION OF DRAWINGS

In the figures, which depict example embodiments.

These figures depict aspects of example embodiments for illustrative purposes.

DETAILED DESCRIPTION

The present disclosure provides a method and system for managing access control of communications between processes executing on a computing device.

Figure 1:
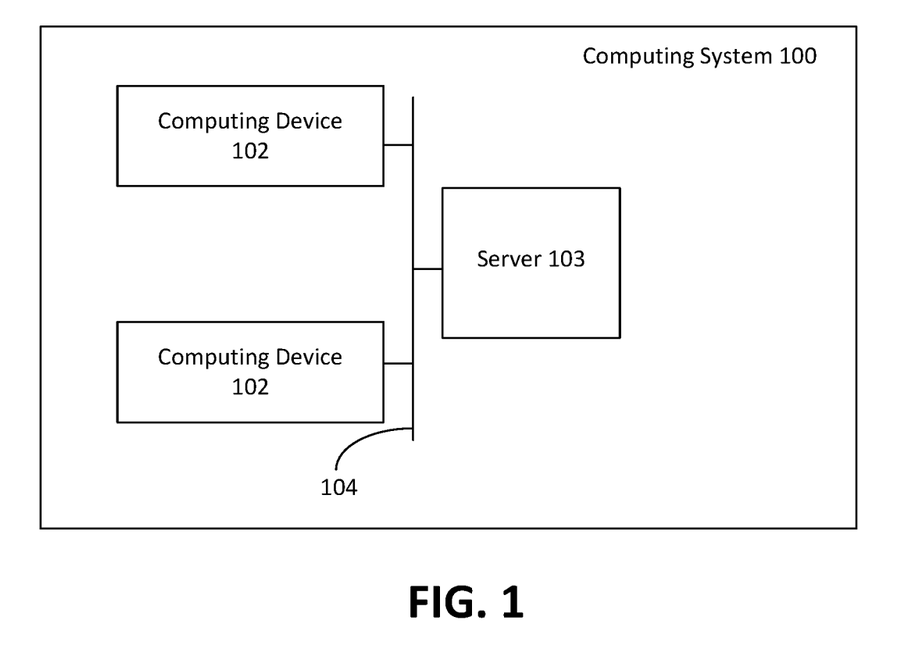
FIG. 1 is a block diagram depicting an example computing system.

FIG. 1 is a block diagram depicting an example computing system 100 in accordance with an embodiment of the present disclosure. In the depicted computing system 100, computing devices 102 can connect directly or indirectly to one or more servers 103 via communication network 104. One of the one or more servers 103 may provide, for example, administrative capabilities for computing device 102. For example, one server 103 may transmit updates to computing devices 102 and another server 103 may maintain a database which can be accessed by computing devices 102. Although FIG. 1 depicts two computing devices 102, in alternate embodiments, computing system 100 may include any suitable number of computing devices 100 that can communicate with server 103 via communication network 104.

Figure 2:
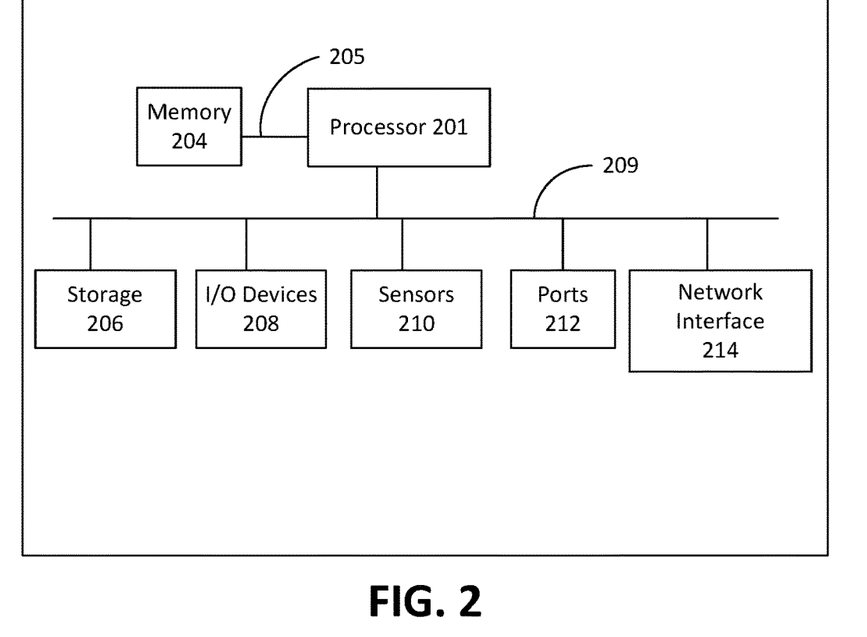
FIG. 2 is a block diagram depicting components of an example computing device.

FIG. 2 is a block diagram depicting components of an example computing device 102 in accordance with an embodiment of the present disclosure. Computing device 102 may be any suitable computing device, such as a smartphone, a desktop computer, a laptop computer, a tablet, and the like. Computing device 102 includes a processor 201 that controls the overall operation of the computing device 102. Processor 201 interacts with memory 204 via a memory bus 205. Processor 201 also interacts with storage 206, I/O devices 208, sensors 210, ports 212, and network interface 214 via a bus 209. Bus 209 may be one or more any type of several buses, including a peripheral bus, a video bus and the like.

Processor 201 may be any suitable type of processor, such as a central processing unit (CPU) implementing for example an ARM or x86 instruction set, and may further include specialized processors such as a Graphics Processing Unit (GPU) or other such processors. It should be appreciated that although a single processor 201 is depicted in FIG. 1, in alternative embodiments, computing device 102 may include multiple processors operating in parallel.

Memory 204 includes any suitable type of system memory that is readable by processor 201, such as static random access memory (SRAM), dynamic random access memory (DRAM), synchronous DRAM (SDRAM), read-only memory (ROM), or a combination thereof. In an embodiment, memory 204 may include more than one type of memory, such as ROM for use at boot-up, and DRAM for program and data storage for use while executing programs. Storage 206 may comprise any suitable non-transitory storage device configured to store data, programs, and other information and to make the data, programs, and other information accessible via bus 209. Storage 206 may comprise, for example, one or more of a solid state drive, a hard disk drive, a magnetic disk drive, an optical disk drive, a secure digital (SD) memory card, and the like.

I/O devices 208 include, for example, user interface devices such as a display device, including a touch-sensitive display device capable of displaying rendered images as output and receiving input in the form of touches. Sensors 210 include one or more speakers, a microphone, a camera, an accelerometer, a global positioning system (GPS) receiver, an ambient light sensor, and the like. Ports 212 may include a universal serial bus (USB) controller for connecting computing device 102 to peripherals, such as a keyboard, a keypad, a mouse, a trackball, and the like.

Network interface 214 is configured to connect computing device 102 to communication network 104. In some embodiments, network interface 214 includes one or more of wired interfaces, such as wired Ethernet, and wireless radios, such as Wi-Fi, Bluetooth, or cellular radios (e.g. GPRS, GSM, EDGE, CDMA, LTE, or the like). Network interface 214 enables computing device 102 to communicate with each server 103 and other computing devices 102 of computing system 100 via communication network 104. Network interface 214 can also be configured to establish virtual network interfaces, such as a Virtual Private Network (VPN). In some embodiments, communication network 104 includes ad-hoc networks and point-to-point communication protocols.

Each server 103 may include one or more similar components to computing device 102 and thus are not described in detail in the present disclosure.

Figure 3:
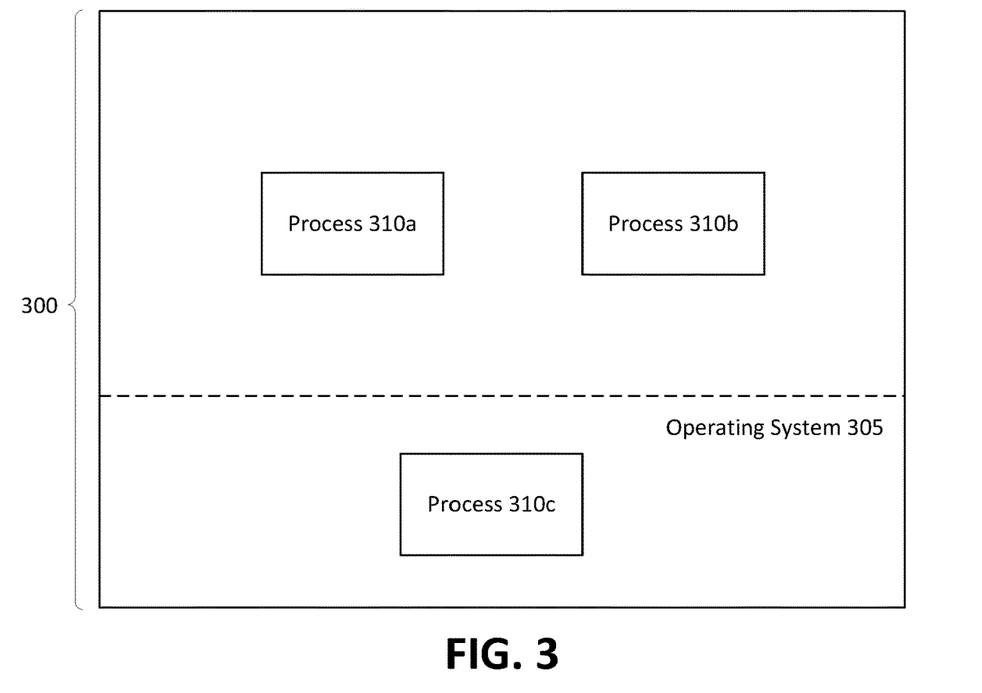
FIG. 3 depicts an example configuration of virtual memory allocation in a computing device.

Computing device 102 operates under control of software programs, including operating system 305 (FIG. 3). Computer-readable instructions or processor executable instructions (e.g. the software code) of operating system 305, are stored in storage 206. During operation of the computing device 102, the software code (e.g. the processor executable instructions) of operating system 305 is loaded into memory 204, and executed by processor 201. Operating system 305 (FIG. 3) may support memory management capabilities, including the use of virtual memory. Virtual memory is a memory management capability that uses hardware and/or software to allow computing device 102 to expand the capacity of memory 204 by temporarily transferring data from memory 204 to storage 206.

FIG. 3 depicts a simplified arrangement of virtual memory 300 allocation in an example computing device 102. It will be appreciated that virtual memory 300 may include memory from one or more of memory 204 and storage 206. Software programs executing on computing device 102 may include, for example, operating system 305 and software processes, such as software processes 310a, 310b and 310c (referred to hereinafter as processes 310a, 310b, 310c) depicted in FIG. 3. During operation of computing device 102, processes, including processes 310a, 310b, and 310c, are loaded into memory 204, and executed by processor 201. Processes 310a, 310b and 310c may include, for example, applications and/or services that comprise computer-readable instructions or processor executable instructions, which when loaded into memory 204, are executed by processor 201. As depicted, process 310c is a system process operating within the virtual memory 300 of operating system 305, and processes 310a and 310b operate outside the virtual memory 300 of operating system 305. Although FIG. 3 illustrates three processes 310a, 310b, 310c, it should be appreciated by those skilled in the art that any number of processes may be executing on the computing device 102 in parallel at any time.

In some embodiments, a process attempts to communicate with another process. Such communication is referred to as interprocess communication (IPC). IPC may be used, for example, to request that an action be performed, obtain access to data from the same process, or another different process, or to launch another process. For example, a social media application may use IPC to request that a camera application on computing device 102 capture an image using a camera of computing device 102 for subsequent posting on a user's social media account. In some embodiments, the IPC is an "Intent" in the Android™ operating system. An Intent is a messaging object which can be used to implicitly or explicitly request an action be performed by another process. Intents may be used, for example, to start an activity, to start a service, or to deliver a broadcast message to other processes.

In the example embodiment shown in FIG. 3, an Intent may be used by process 310b to deliver a broadcast message to other processes 310a and 310c. It should be appreciated that IPCs other than Intents may be used. In some embodiments, the broadcast message is system-wide.

In some embodiments, operating system 305 might allow such broadcast messages to occur by default. For example, operating system 305 may provide a baseline level of permissions on a process-level basis (e.g. a binary rule as to whether a process such as process 310a has permission to communicate with another process, such as process 310b). However, the use of a simple binary system does not provide adequate security or flexibility. For example, there is no such permission required to pass system notifications to a user.

Figure 4:
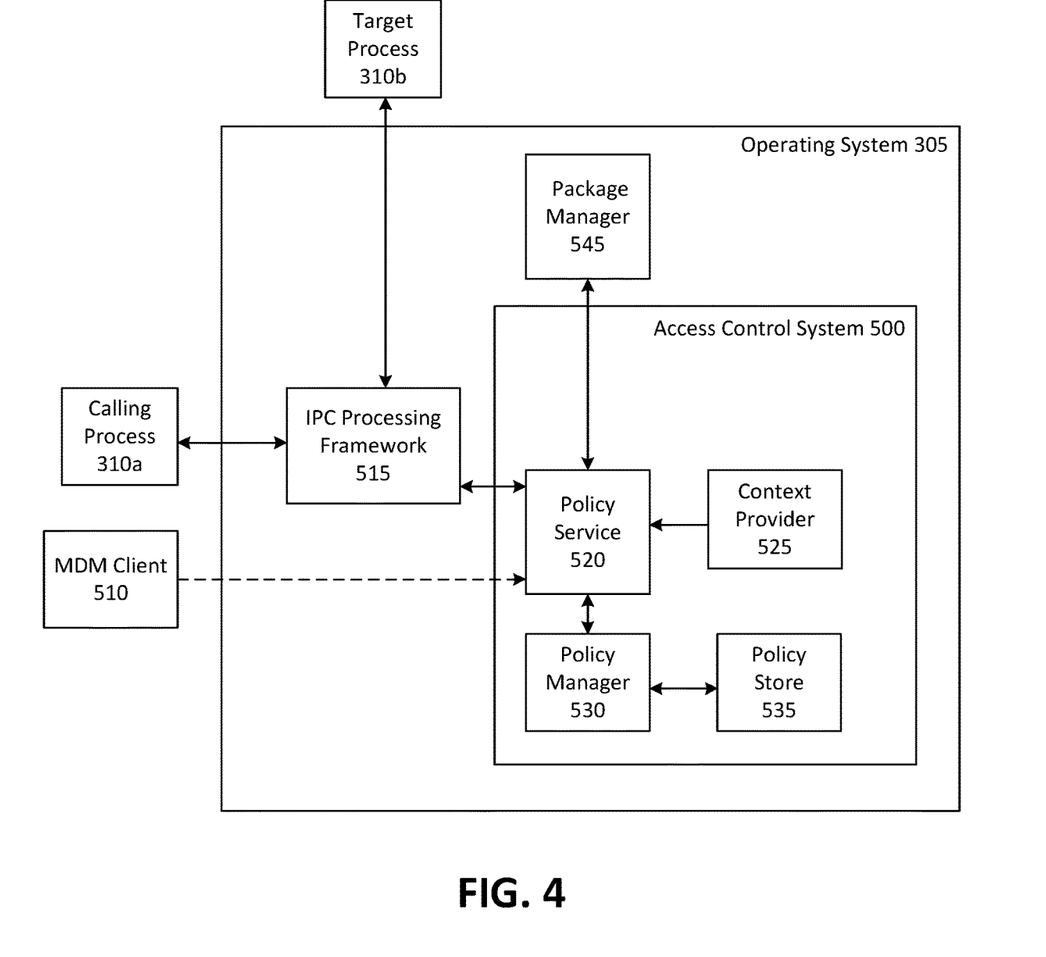
FIG. 4 is a block diagram depicting components in an example access control system.

FIG. 4 is a block diagram depicting components of an Access Control System 500 for managing access control of communications between processes executing on computing device 102 in accordance with an embodiment of the present disclosure. In FIG. 4, Access Control System 500 is depicted as being implemented within the operating system 305, which is an Android™ operating system. It should be appreciated that Access Control System 500 may be implemented within other operating systems and the principles of the present disclosure described herein are applicable to other operating systems and thus not intended to be limited to the Android™ operating system. As depicted in FIG. 4, operating system 305 comprises Access Control System 500, IPC Processing Framework 515, and Android™ Package Manager 545 (referred to hereinafter as Package Manager 545). Access Control System 500 includes Policy Service 520, Context Provider 525, Policy Manager 530, and Policy Store 535. As depicted in FIG. 4, IPC Processing Framework 515, and Package Manager 515, and Access Control System 500 are separate software components or software modules of operating system 305, with each separate software component or software module comprising computer-readable or processor executable instructions, which when loaded into memory 204 and executed by processor 201 cause computing device 102 to perform the method described below. In some embodiments, Policy Service 520 and Policy Manager 530 may be implemented as one software component or software module in Access Control System 500 that comprises computer-readable or processor executable instructions.

IPC Processing Framework 515 provides information about and interacts with processes, such as for example processes 310a, 310b. In some embodiments, the IPC Processing Framework 515 may include an Android™ Activity Manager. In some embodiments, IPC Processing Framework 515 may include one or more of a Notification Manager, a Service Manager, a Content Manager, or any other suitable framework that uses messaging for IPC communications between processes. IPC Processing Framework 515 is configured to receive IPCs, such as for example, an Intent from a calling process, such as for example process 310a. IPC Processing Framework 515 is also configured to determine an identifier associated with the calling process (referred to hereinafter as a calling process identifier), determine one or more target processes for the IPC, such as for example process 310b, determine an identifier associated with each of the determined target processes (referred to hereinafter as target process identifier), and forward the calling process identifier and each of the target process identifiers to the Access Control System 500.

Access Control System 500 is configured to communicate with IPC Processing Framework 515 and the Package Manager 545 . . . Access Control System 500 is configured to receive the calling process identifier and each of the target process identifiers from the IPC Processing Framework 515 and determines whether to permit the IPC Processing Framework 515 to process an IPC, and send a message to the IPC Processing Framework 515 indicating whether or not the IPC Processing Framework 515 is permitted to process the IPC, as described in further detail below.

In the embodiment depicted in FIG. 4, process 310a is a calling process that sends an IPC, and process 310b is the target process for the IPC sent by the process 310a.

Access Control System 500 is configured to determine whether to permit IPC Processing Framework 515 to process an IPC by administering or performing an access control check. In some embodiments, the access control check includes a pre-authorization check and a policy check. The access control check may be administered or performed by Policy Manager 530 of Access Control System 500. The access control check includes an analysis of IPC metadata and an analysis of contextual attribute data. The analysis of IPC metadata and the analysis of contextual attribute data may be performed concurrently. Alternatively, the analysis of IPC metadata and the analysis of contextual attribute data may be performed independently. The administration of the access control check includes obtaining, by Policy Server 520, IPC metadata based on the calling process identifier and the target process identifier, obtaining, by Policy Server 520, contextual attribute data, and providing by Policy Server 520, the IPC metadata and the contextual attribute data to Policy Manager 530. Policy Manager 530 is configured to administer or perform the access control check, including the pre-authorization check and the policy check to determine whether to permit IPC Processing Framework 515 to process an IPC.

IPC metadata includes calling process attribute data for a calling process 310a, target process attribute data for each target process, including target process 310b, and IPC attribute data for the IPC (hereinafter referred to as IPC attribute data). In some embodiments, calling process attribute data for a calling process, target process attribute data for a target process, and IPC attribute data for the IPC are obtained by the Policy Service 520 from Package Manager 545. The Package Manager 545 retrieves calling process attribute data, the target process attribute data, and the IPC attribute data from memory 204 and forwards the calling process attribute data, the target process attribute data, and the IPC attribute data to the Policy Service 520. In some embodiments, the calling process attribute data, the target process attribute data, and the IPC attribute data may be obtained from memory 204 by another process of operating system 305, such as IPC Processing Framework 515, for example.

In some embodiments, contextual attribute data is obtained by the Policy Service 520 from Context Provider 525. Context Provider 525 is configured to obtain contextual attribute data from memory 204. In some embodiments, contextual attribute data may be obtained from memory 204 by another process of operating system 305, such as IPC Processing Framework 515, for example.

IPC attribute data may be data representative of one attribute of the IPC that is typically associated with IPC Processing Framework 515. Alternatively, IPC attribute data may be representative of a plurality of attributes of IPCs. An attribute of an IPC is referred is to hereinafter as IPC attribute. Examples of an IPC attribute include IPC type (e.g. notification, activity, broadcast) and a number of IPC targets.

Calling process attribute data may be data representative of one calling process attribute that may be stored by Package Manager 545, or by some other process of operating system 305, in memory 204 on a persistent or at least semi-persistent basis. Alternatively, calling process attribute data may be representative of a plurality of calling process attributes that may be stored by Package Manager 545, or by some other process of operating system 305, in memory 204 on a persistent or at least semi-persistent basis. A calling process attribute is information associated with the calling process, such as process 310a. Examples of calling process attributes include: a tag or identifier associated with the calling process 310a which uniquely identifies the calling process 310a (e.g. the calling process identifier); a tag or identifier that identifies that the calling process 310a is a system process; a tag or identifier used to differentiate between trusted and untrusted developers; a tag or identifier that identifies the service used to install the calling process 310a (e.g. a native installation service, such as Google Play, as compared to an application which has been "side-loaded" and installed manually by the user); and a property of the user environment using the calling process 310a (e.g. a primary user profile or a managed user profile).

Target process attribute data may be data representative of one target process attribute that may be stored by Package Manager 545, or by some other process of operating system 305, in memory 204 on a persistent or at least semi-persistent basis. Alternatively, target process attribute data may be data representative of a plurality of target process attributes that may be stored by Package Manager 545, or by some other process of operating system 305, in memory 204 on a persistent or at least semi-persistent basis. A target process attribute is information associated with a target process 310b. Examples of target process attributes include: a tag or identifier associated with the target process 310b which uniquely identifies the target process 310b (e.g. the target process identifier); a tag or identifier that identifies that the target process 310b is a system process; a tag or identifier that identifies the service used to install the target process 310b; and a property of the user environment using the target process 310b (e.g. a primary user profile or a managed user profile).

Contextual attribute data may be data representative of one contextual attribute of operating system 305 that is typically stored by Context Provider 525 in memory 204 on a persistent or at least semi-persistent basis. Alternatively, contextual attribute data may be data representative of a plurality of contextual attributes of operating system 305 that is typically stored by Context Provider 525 in memory 204 on a persistent or at least semi-persistent basis. A contextual attribute of operating system 305 is information calculated or determined from a state of operating system 305. Examples of a contextual attribute of operating system 305 include a value derived from information obtained from sensors 210 (e.g. a location of computing device 102 derived from information obtained from the GPS receiver of computing device 102, a time stamp indicative of the date and/or time at which the IPC was received by IPC Processing Framework 515 obtained from a timer of computing device 102, W-Fi access point signal strength derived from information obtained from network interface 214, ambient light levels derived from information obtained from an ambient light sensor of computing device 102), a state created during OS operation (e.g. a process identifier of an application running on computing device 102 with top user interface focus), and a status derived from information obtained from sensors 210 of computing device 102 (e.g. a network connectivity status derived from information obtained from network interface 214, a camera status derived from information obtained from the camera of computing device 102, a microphone status derived from information obtained from the microphone of computing device 102).

As mentioned above, Policy Manager 530 of Access Control System 500 is configured to determine whether to permit IPC Processing Framework 515 to process an IPC by administering or performing an access control check that includes the policy check. The policy check comprises determining whether to permit an IPC to be processed on the basis of access policies. The access policies may include permit policies and deny policies. Each permit policy is an access policy which indicates that an IPC between processes (e.g. a calling process 310a and a target process 310b) is permitted or authorized. Each deny policy is an access policy which indicates that an IPC between processes (e.g. a calling process 310a and a target process 310b) is denied or not authorized. In some embodiments, the policies are stored by Policy Store 535 in storage 206 and may be updated by Mobile Device Management (MDM) client 510. In some embodiments, the policies are stored by Policy Store 535 in a database in storage 206. The database may be a centralized database or a distributed database. In some embodiments, the access policies are stored by Policy Store 535 in a look-up table in storage device 206.

Examples of permit and deny policies include: a deny policy to deny IPC Processing Framework 515 from processing an IPC when the IPC has been received from a calling process which has been side-loaded into the computing device; a permit policy to permit IPC Processing Framework 515 to process an IPC received from a calling process if the calling process were installed via a system installer (e.g. Google Play); a permit policy to permit IPC Processing Framework 515 to process an IPC received from a calling process 310a which was developed by a preferred developer (e.g. Google); deny policy to deny IPC Processing Framework 515 from processing an IPC when the IPC is received from a calling process developed by a developer other than a preferred developer; a permit policy to permit IPC Processing Framework 515 to process an IPC for all IPCs originating from a calling process that has the "system" flag; and a permit policy to permit IPC Processing Framework 515 to process an IPC to enable a broadcast IPC to reach a target process that is running in a managed profile only during works hours.

It should be appreciated that many different access policies may be stored in Policy Store 535 which may depend on variations of the calling process attribute data, target process attribute data, the IPC attribute data, and contextual attribute data. Moreover, it should be appreciated that the access control check of the present disclosure has a greater degree of customizability and granularity with respect to existing Android™ IPC permission checks.

The administration or performance of the pre-authorization check of the access control check may be based on a comparison of the IPC metadata for pre-authorization to a list of pre-authorized processes as described in further detail below. The administration or performance of the policy check of the access control check may be based on a comparison of the IPC metadata for the policy check and the contextual attribute data to one or more access policies retrieved by Policy Store 535 from memory 204 as described in further detail below. When Policy Manager 530 determines that the IPC metadata for the policy check and the contextual attribute data matches one of the permit policies, Policy Manager 530 sends a permit message to IPC Processing Framework 515 via Policy Service 520. The permit message indicates to IPC Processing Framework 515 that it is permitted or authorized to process the IPC for transmission to a target process, such as process 310b for example. IPC Processing Framework 515, after receipt of the permit message, processes the IPC and transmits the IPC to the target process, such as process 310b for example. However, when Policy Manager 530 determines that the IPC metadata for the policy check and the contextual attribute data do not match one of the permit policies stored in Policy Store 535, or match one of the deny policies stored in the Policy Store 535, Policy Manager 530 sends a deny message to IPC Processing Framework 515 via Policy Service 520. The deny message indicates to IPC Processing Framework 515 that it is not permitted or authorized to process the IPC for transmission to target process, such as process 310b, for example. IPC Processing Framework 515, after receipt of the deny message, prevents processing of the IPC and the IPC is not transmitted to the target process, such as process 310b for example.

In some embodiments, after receipt of an IPC from a calling process, the IPC Processing Framework 515 may also be configured to perform IPC routing and to determine whether to permit or deny the IPC based on a permission check. IPC Processing Framework 515 may administer or perform the permission check on the basis of Android™ permission checks for IPCs. The administration or performance of a permission check on the basis of Android™ permission checks for IPCs by an IPC Processing Framework 515 is known to those skilled in the art and is therefore not described in detail in the present disclosure.

Therefore, in some embodiments, Access Control System 500 and IPC Processing Framework 515 each independently determine whether to permit IPC Processing Framework 515 to process an IPC on the basis of different checks (e.g. Access Control System 500 on the basis of an access control check and IPC Processing Framework 515 on the basis of Android™ permission checks for IPCs). Hence, it is contemplated that in some embodiments Access Control System 500 prevents or denies IPC Processing Framework 515 from processing an IPC due to the IPC attribute data not matching any of the permit policies or matching one of the deny policies in Policy Store 535 even though IPC Processing Framework 515 may be permitted to allow the IPC on the basis of Android permission checks for IPCs.

Figure 5:
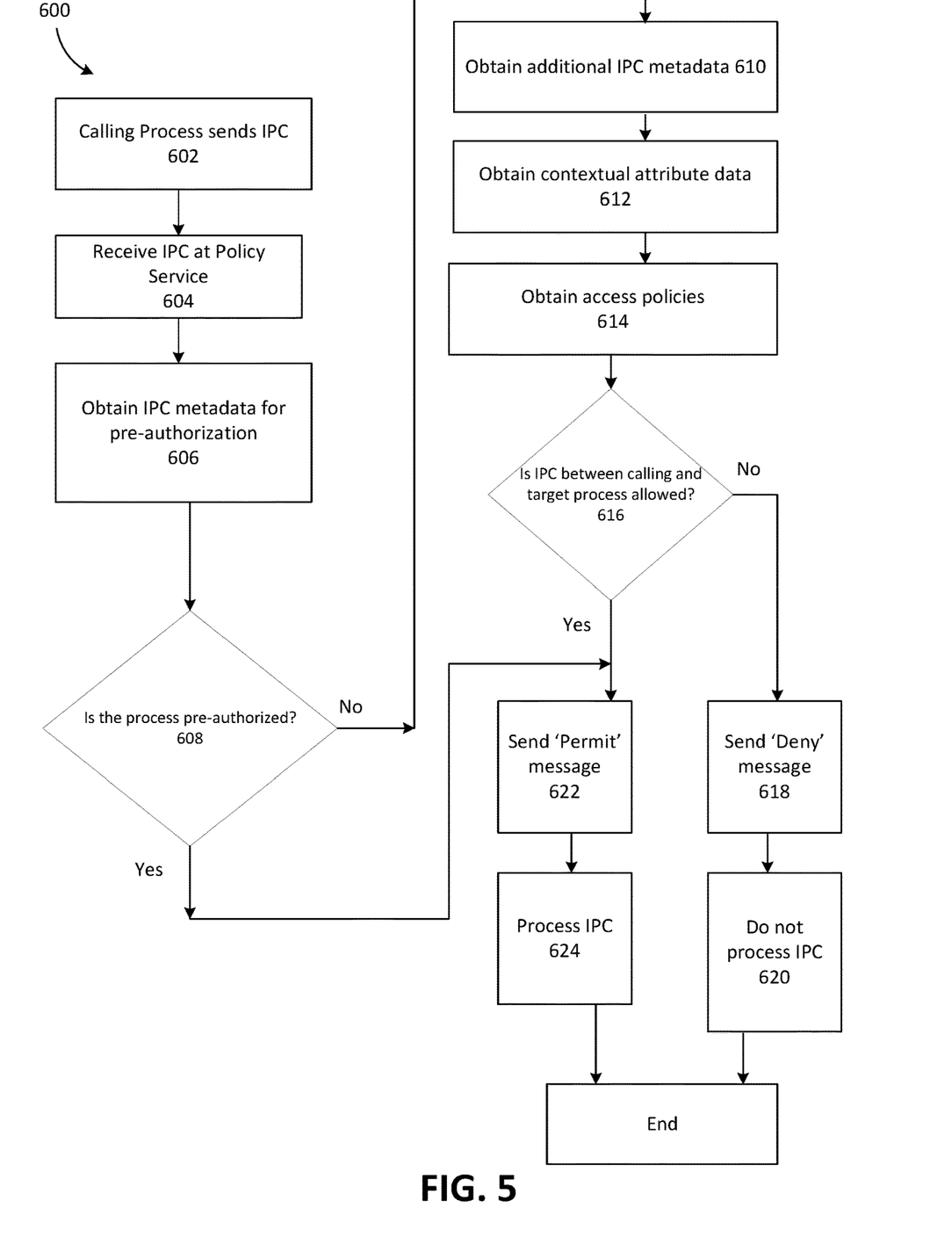
FIG. 5 is a flow chart of an example method of controlling interprocess communication.

FIG. 5 is a flow chart depicting an example method 600 of managing access control of IPCs between processes executing on computing device 102 in accordance with an embodiment of the present disclosure. Method 600 begins with a calling process, such as process 310*a* sending an IPC at 602. For the purposes of the description of FIG. 5, the process 310*a* will be referred to as calling process 310*a*. In some embodiments, the IPC is an Intent and the Intent is sent by the calling process and received by IPC Processing Framework 515.

At 604, the IPC Processing Framework 515 receives the IPC sent by the calling process 310*a*, determines a target process for the IPC (e.g. process 310*b*) and determines an identifier of the target process 310*b*. The IPC Processing Framework 515 also determines an identifier of the calling process 310*a* and forwards (e.g. sends) the identifier of the calling process and the identifier of the target process to Policy Service 520 of Access Control System 500. In some embodiments, IPC Processing Framework 515 maintains a list of target processes for different IPCs. In some embodiment, IPC Processing Framework 515 may be configured to use IPC routing to determine the target process for the IPC. In some embodiments, IPC Processing Framework 515 may be configured to determine the target process for the IPC using a look-up to select a target process associated with the received IPC from the list of target processes for different IPCs. After Policy Service 520 receives the identifier of the calling process 310*a* and the identifier of the target process 310*b*, method 600 proceeds to 606.

At 606, Policy Service 520 obtains IPC metadata for pre-authorization and sends the IPC metadata for pre-authorization to Policy Manager 530. Policy Service 520 may obtain IPC metadata for pre-authorization based on at least one of the identifier of the calling process and the identifier of the target process. In some embodiments, the obtained IPC metadata for pre-authorization includes calling process attribute data for calling process 310*a*. In some embodiments, the obtained IPC metadata for pre-authorization includes target process attribute data for target process 310*b*. In some embodiments, the obtained IPC metadata for pre-authorization includes calling process attribute data for calling process 310*a* and target process attribute data for target process 310*b*. In some embodiments, the IPC metadata includes IPC attribute data. In some embodiments, IPC metadata for pre-authorization is obtained by Policy Service 520 from Package Manager 545.

After Policy Service 520 sends the IPC metadata for pre-authorization to Policy Manager 530, method 600 proceeds to 608. At 608, Policy Manager 530 performs or administers a pre-authorization check of the access control check. The pre-authorization check may include determining whether at least one of the calling process 310*a* and the target process 310*b* is a pre-authorized process. In some embodiments, a list of pre-authorized processes (referred to hereinafter as a "whitelist") is maintained and determining whether at least one of the calling process 310*a* or the target process 310*b* is a pre-authorized process is based on the list of pre-authorized processes (e.g. the whitelist). The whitelist may be maintained, for example, in Policy Store 535. The "whitelist" may include identifiers of processes that are pre-authorized. The pre-authorized processes in the "whitelist" may be either calling processes and/or target processes. The "whitelist" may include calling process attribute data for one or more calling processes which identifies each of the calling processes as a pre-authorized process. The "whitelist" may also include target process attribute data for one or more target processes which identifies each of the target processes as a pre-authorized process. In some embodiments, calling process 310*a* is a pre-authorized process which is permitted to perform IPCs by default, without having regard to contextual attribute data or target process attribute data for the target process 310*b*. In some embodiments, a target process 310*b* is a pre-authorized process which is permitted to receive IPCs by default. For example, it may be desirable for some system processes in the Android™ operating system to be pre-authorized process that are permitted to communicate with other processes without the additional processing overhead associated with the policy check of the access control check. For example, a wireless network management service in operating system 305 may attempt to broadcast a notification if the wireless connection is lost. It may be advantageous for such system processes to be permitted without requiring the additional checks of Access Control System 500. Thus, such system processes may be included in the whitelist.

In some embodiments, some pre-authorized processes in the whitelist may include a criterion, a tag, an identifier, or a name that indicates that the calling process 310*a* is a system process. Some pre-authorized processes in the whitelist may also include a criterion, a tag, an identifier, or a name that indicates that the target process 310*b* is a system process. In some embodiments, the whitelist may be updated to add new pre-authorized processes to the whitelist or to remove pre-authorized process from the whitelist. The updating of the whitelist may be performed in response to receipt of an instruction to update the pre-authorized process. For example, the instruction may be generated when a user of computing device 102 or a system administrator, using, for example, a graphical user interface rendered on display device of computing device 102, or MDM client 510 administered by Server 103 updates (e.g. adds or removes) pre-authorized processes from the "whitelist".

If either of the calling process 310*a* or target process 310*b* is determined to be a pre-authorized process, method 600 proceeds to 622, where a 'Permit' message is sent by Policy Manager 530 to IPC Processing Framework 515 via Policy Service 520. At 624, after receiving the 'Permit' message, IPC Processing Framework 515 proceeds to process the IPC. In some embodiments, the IPC is an Intent and at 624, IPC Processing Framework 515 processes the Intent. In some embodiments, IPC Processing Framework 515 performs an Android™ permission check for the IPC after receiving a 'Permit' message from Access Control System 500.

At 608, if neither of the calling process 310*a* and the target process 310*b* is determined to be a pre-authorized process, method 600 proceeds to 610. At 610, Policy Service 520 obtains IPC metadata for a policy check and method 600 proceeds to 612. At 612, contextual attribute data is obtained and method 600 proceeds to 614. In some embodiments, IPC metadata for a policy check is obtained by Policy Service 520 from Package Manger 545, which retrieves the IPC metadata for the policy check from memory 204. In some embodiments, the contextual attribute data is obtained by Policy Service 520 from Context Provider 525, which retrieves the contextual attribute data from memory 204.

At 614, after obtaining the contextual attribute data, Policy Service 520 provides the IPC metadata for a policy check and the contextual attribute data to Policy Manager 530. Policy Manager 530 obtains access policies from Policy Store 535 and method 600 proceeds to 616.

At 616, Policy Manager 530 administers or performs the policy check of the access control check to determine whether the IPC is permitted based on the access policies obtained from Policy Store 535 on the basis of the IPC metadata for a policy check and the contextual attribute data to the access policies.

The determination to permit the IPC is made on the basis of the IPC metadata for a policy check and the contextual attribute data by comparing the IPC metadata for a policy check and the contextual attribute data to one or more of the access policies. In some embodiments, the access policies can be customized by the user of computing device 102. In some embodiments, the policies are controlled by a mobile device management administrator (e.g. MDM client 510). In some embodiments, an MDM administrator can update the access control policies remotely using MDM client 510, which can send an instruction to update the access policies to the Access Control System 500 of the operating system 302.

At 616, after determining that the IPC metadata for a policy check and the contextual attribute data do not match any of the permit policies, or matches one of the deny policies, the Policy Manager 530 sends a 'Deny' message to IPC Processing Framework 515 via Policy Service 520 at block 618. At 620, after receiving the 'Deny' message, IPC Processing Framework 515 foregoes making any further determinations for the IPC, as the IPC is not permitted to be processed regardless of whether the Android permission check administered or performed by IPC Processing Framework 515 determines that the IPC should be permitted. It should be appreciated that in some embodiments, in order for IPCs to occur, permission must be granted by both the Policy Manager 530 and the IPC Processing Framework 515 (which administers or performs Android™ permission checks for IPCs as described above).

At 616, after determining that the IPC metadata for a policy check and the contextual attribute data match one of the permit policies stored in Policy Store 535, Policy Manager 530 sends a 'Permit' message to IPC Processing Framework 515 via Policy Service 520 at 622. At 624, IPC Processing Framework 515 receives the 'Permit' message and proceeds to process the IPC in accordance with Android™ permission checks for IPCs administered or performed by IPC Processing Framework 515, as outlined above. If the IPC is permitted by both the access control checks administered or performed by Policy Manager 530 and the Android™ permission checks for IPCs administered or performed by IPC Processing Framework 515, then IPC Processing Framework 515 permits or authorizes the IPC and sends the IPC the to the target process 310*b*.

As noted above, many different access policies may be stored in Policy Store 535. In an example embodiment, the access policies relate to the time of day on which the IPC is received and the geographic location of computing device 102. In an example embodiment, an IPC from calling process 310*a* is received by IPC Processing Framework 515 at 10:30 am on a weekday. The contextual attribute data received by policy service 520 may indicate that the user of computing device 102 is presently located at their place of employment. Policy store 535 may contain a policy that IPC is permitted between calling process 310*a* and target process 310*b* during weekdays between the hours of 9:00 am and 5:00 pm, provided the location of computing device 102 is at location coordinates that correspond to the user's place of employment. As such, Policy Manager 530 sends a 'Permit' message to IPC Processing Framework 515 via the Policy Service 520 which indicates to IPC Processing Framework 515 to process the IPC.

In some embodiments, operating system 305 executing on computing device 102 supports multiple user profiles. User profiles allow for processes to execute in an environment with a degree of segregation from other profiles. For example, the Android™ operating system supports the use of a primary profile and one or more managed profiles. A managed profile is controlled by a MDM administrator, and the functionality available to the managed profile may be set separately from the full functionality available in a user's primary profile. The use of multiple user profiles allows for greater control over certain aspects of computing device 102's operation.

An employer may provide an employee with computing device 102 (e.g. an iPhone™ or Android™ device) on which the employee can carry out various functions for their employment (e.g. receiving and responding to e-mail messages from clients, conducting telephone calls, and the like). To enhance device security, an employer may provision the computing device 102 with a managed profile 307. Managed profile 307 is a segregated environment in which, for example, processes (e.g. applications and services) relating to work (e.g. e-mail and telephone processes) are executed. In some embodiments, administration of managed profile 307 is controlled remotely by a Mobile Device Management (MDM) administrator. The MDM administrator may be an IT administrator (e.g. MDM client 510 as depicted in FIG. 4) of the employer that can communicate with computing device 102 from server 103 via network interface 210.

Figure 6:
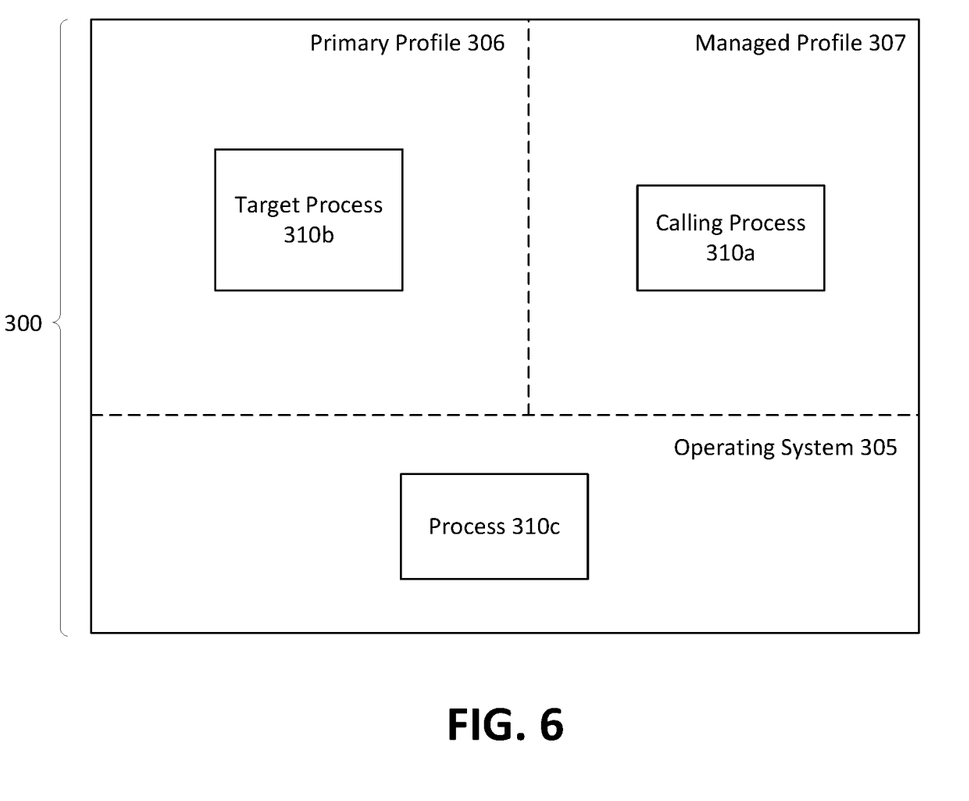
FIG. 6 depicts an example configuration of virtual memory allocation in a computing device having a personal profile and a managed profile.

FIG. 6 depicts a simplified arrangement of virtual memory 300 allocation in an example computing device 102 which supports multiple user profiles. As depicted, virtual memory 300 of computing device 102 is segregated into operating system 305, primary profile 306, and managed profile 307. In the example embodiment of FIG. 6, a calling process (e.g. process 310*a*) is a work email application that sends an IPC and a target process (e.g. process 310*b*) for the IPC sent by the calling process (e.g. process 310*a*) is a social media application. As depicted, work email application 310*a* is executing in managed profile 307, and social media application 310*b* is executing in primary profile 306. It should be appreciated that embodiments are contemplated in which the calling process 310*a* is executing in a primary profile 306 and the target process 310*b* is executing in a managed profile 307.

Managed profile 307 can be managed remotely by an MDM client 510. In some embodiments, MDM client 510 is an application on computing device 102. In some embodiments, MDM client 510 is controlled by server 103 through an MDM communication channel or other back channel via communications network 104. MDM client 510 may provide updates to the policies to Policy Service 520, which may be enforced by Policy Manager 530 and Policy Store 535. MDM client 510 can exercise control over a number of aspects of computing device 102. For example, MDM client 510 can install and uninstall processes, such as applications from computing device 102 within the managed profile 307.

As an example use case, after receipt of a new email, work email application 310*a* may broadcast a notification to the user (for example, an alert appearing at the top of the user interface overtop of an application currently being displayed). In some embodiments, such an alert might include one or more of the name of the sender of the received e-mail, a subject line, and a sample of some of the text of the email. The displaying of such alerts may not be desirable in certain situations, as such notifications may contain information which is confidential and unsuitable for display depending on the situation and context. For example, if the user of the computing device 102 is away from the office and located in a public space, it would not be desirable for confidential work-related information to be displayed in the form of a notification.

In some embodiments, Policy Store 535 includes a deny policy that prevents IPC Processing Framework 515 from allowing IPCs from occurring between a calling process 310a in managed profile 307 and a target process 310b in primary profile 306. In conventional Android™ operating systems, an application (e.g. social media application 310b) can listen or poll for notifications from a Notification System Framework and gather data from received notifications. For example, a notification from email application 310a in managed profile 307 can be detected by social media application 310b in primary profile 306, which may allow social media application 310b to gather data from the notification. Conventional Android™ operating systems may require permission for an application to listen for such notifications. However, such a permission applies to all notifications, regardless of source. Aside from the blanket approval to listen or detect notifications, there is no requirement for particular permissions to be obtained for notifications from a calling process 310a executing within managed profile 307 to a target process 310b within primary profile 306. As such, conventional Android permission checks for IPCs in the Android™ operating system do not prevent notifications containing potentially sensitive information from being detected and read by a target process 310b in a primary profile, which can result in confidential information (e.g. email recipients, the subject line, a preview of the text of the email, or the like) being exposed to a target process 310b executing within the primary profile 306.

In contrast, in an embodiment of the present invention, when a calling process in managed profile 307 (e.g. calling process 310a) sends an IPC intended for a target process (e.g. target process 310b), IPC Processing Framework 515 receives the IPC, determines an identifier of the calling process 310a and an identifier of the target process 310b, and forwards the identifier of the calling process 310a and the identifier of the target process 310b to Policy Service 520 of Access Control System 500. Policy Service 520 obtains calling process attribute data for the calling process 310a from Package Manager 545 which indicates that calling process 310a is executing in managed profile 307. Policy Service 520 also obtains target process attribute data for target process 310b from Package Manager 545 which indicates that target process 310b is executing in primary profile 306. Policy Service 520 may also obtain contextual attribute data from Context Provider 535. Policy Service 520 may also obtain IPC attribute data from IPC Processing Framework 515.

Policy service 520 provides the calling process attribute data 310a, the target process attribute data for target process 310b, the IPC attribute data, and the contextual attribute data to the Policy Manager 530. Policy Manager 530 compares the calling process attribute data for the calling process 310a, the target process attribute data for the target process 310b, the IPC attribute data, and the contextual attribute data to access policies obtained by the Policy Store 535 from memory 204 to determine whether the IPC is permitted. In this embodiment, the access policies include a deny policy which indicates that IPCs between processes across managed profile 307 and primary profile 306 are not permitted. Policy Manager 530 determines that IPCs are not permitted between calling process 310a and target process 310b based on the comparison and sends a 'Deny' message to IPC Processing Framework 515 via Policy Service 520. Thus, in the example above, the social media application 310b would be unable to receive and gather data from the notification sent by email application 310a. Thus, the likelihood of sensitive data being leaked is reduced, according to some embodiments.

Further examples of IPCs which the Access Control System 500 may communicate with IPC Processing Framework 515 to prevent IPCs from being read by processes may include, for example, attempts to access sensor data (e.g. microphone audio) by a process, and attempts to access system processes (e.g. a contacts database, a cellular radio state, or the like) by a process.

The embodiments described herein provide an advantage of performing access control checks for IPCs with a higher degree of granularity and flexibility than permission checks of conventional Android™ operating systems. Conventional Android™ operating systems do not take calling process attribute data, target process attribute data, the IPC attribute data, or contextual attribute data of the operating system into account in permission checks for IPCs. The embodiments described herein allow for enhanced functionality of computing devices by providing an Access Control System in an operating system of a computing device that permits an IPC Processing Framework of the operating system, such as an Android™ operating system, to process an IPC on the basis of IPC metadata, and contextual attribute data to reduce the likelihood of unauthorized communications between processes executing on the computing device. The embodiments described herein also provide the ability to customize and update access policies for processing IPCs on computing devices to mitigate security risks associated with malicious applications running on the computing device.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps.

As can be understood, the detailed embodiments described above and illustrated are intended to be examples only. Variations, alternative configurations, alternative components and modifications may be made to these example embodiments. The invention is defined by the claims.

What is claimed is:

1. A method comprising:
receiving, by an access control system of an operating system executing on a computing device, an interprocess communication (IPC);
receiving, by the access control system, an identifier of a calling process for the IPC and an identifier of a target process for the IPC;
obtaining, by the access control system, the IPC metadata based on the identifier of the calling process and the identifier of the target process, wherein the IPC metadata includes calling process attribute data for the calling process, target process attribute data for the target process, and IPC attribute data for the IPC:
obtaining, by the access control system, contextual attribute data for the operating system;
determining, by the access control system, based on the IPC metadata including the calling process attribute data, the target process attribute data, and the IPC attribute data and based on the contextual attribute data of the operating system, whether the IPC is permitted, wherein the target process attribute data includes information identifying whether the target process is a system process, information identifying a service used to install the target process, and information identifying whether a user environment in which the target process runs is a primary profile or a managed user profile, wherein the IPC attribute data includes an IPC type of the IPC and a number of targets of the IPC, and wherein the contextual attribute data includes Wi-Fi access point signal strength, a process identifier of an application with top user interface focus, an ambient light level, a network connectivity status, a camera status, and a microphone status;

and sending, by the access control system, a message indicating whether the IPC is permitted.

2. The method of claim 1, wherein the sending comprises sending a permit message indicating that processing of the IPC is permitted after determining that the IPC is permitted.

3. The method of claim 1, wherein the sending comprises sending a deny message indicating that processing of the IPC is not permitted after determining that the IPC is not permitted.

4. The method of claim 1, wherein obtaining the IPC metadata comprises obtaining IPC metadata for a pre-authorization check and the IPC metadata for a policy check, and wherein determining, by the access control system, whether the IPC is permitted comprises performing an access control check comprising the pre-authorization check and the policy check.

5. The method of claim 4, further comprising:
performing the policy check of the access control check by comparing the IPC metadata for the policy check and the contextual attribute data to one or more access policies;
determining whether the IPC metadata and the contextual attribute data match one of the one or more access policies; and
sending a permit message indicating that processing of the IPC is permitted after determining that the IPC metadata and the contextual attribute data match one of the one or more access policies.

6. The method of claim 4, further comprising:
performing the pre-authorization check by determining, based on the IPC metadata for pre-authorization whether at least one of the calling process and the target process is a pre-authorized process; and
sending, after determining that at least one of the calling process and the target process is the pre-authorized process, a permit message indicating that processing of the IPC is permitted.

7. The method of claim 6, wherein determining, based on the IPC metadata for the pre-authorization whether at least one of the calling process and the target process is the pre-authorized process comprises:
determining whether at least one of calling process and the target process comprises a criterion indicating that the at least one of the calling process and the target process is the pre-authorized processes.

8. The method of claim 4, further comprising:
receiving, by the access control system, an instruction to update one or more access policies; and
updating, by the access control system, the one or more access policies based on the instruction.

9. A computing device comprising: at least one processor;
a memory communicatively coupled to the at least one processor, the memory having stored thereon processor-executable instructions that, when executed by the at least one processor, cause the at least one processor to:

receive an interprocess communication (IPC) from a calling process executing on the computing device;
receive an identifier of the calling process and an identifier of a target process for the IPC;
obtain IPC metadata based on the identifier of the calling process and the identifier of the target process, wherein the IPC metadata includes calling process attribute data for the calling process, target process attribute data for the target process, and IPC attribute data for the IPC;
obtaining contextual attribute data of an operating system executing on the computing device;
determine based on the IPC metadata including the calling process attribute data, the target process attribute data, and the IPC attribute data and based on the contextual attribute data whether the IPC is permitted, wherein the target process attribute data includes information identifying whether the target process is a system process, information identifying a service used to install the target process, and information identifying whether a user environment in which the target process runs is a primary profile or a managed user profile, wherein the IPC attribute data includes an IPC type of the IPC and a number of targets of the IPC, and wherein the contextual attribute data includes Wi-Fi access point signal strength, a process identifier of an application with top user interface focus, an ambient light level, a network connectivity status, a camera status, and a microphone status; and
send a message indicating whether the IPC is permitted.

10. The computing device of claim 9, wherein the processor-executable instructions, when executed by the at least one processor, cause the at least one processor to send a permit message indicating that processing of the IPC is permitted after a determination that the IPC is permitted.

11. The computing device of claim 9, wherein the processor-executable instructions, when executed by the at least one processor, cause the at least one processor to send a deny message indicating that processing of the IPC is not permitted after a determination that the IPC is not permitted.

12. The computing device of claim 9, wherein the processor-executable instructions, when executed by the at least one processor, cause the at least one processor to obtain the IPC metadata by obtaining the IPC metadata for a pre-authorization check and the IPC metadata for a policy check, and to determine whether the IPC is permitted by performing an access control check comprising the pre-authorization check and the policy check.

13. The computing device of claim 12, wherein the processor-executable instructions, when executed by the at least one processor, cause the at least one processor to perform the policy check of the access control cheek by comparing the IPC metadata for the policy check and the contextual attribute data to one or more access policies, to determine whether the IPC metadata and the contextual attribute data match one of the one or more access policies, and to send a permit message indicating that processing of the IPC is permitted after determining that the IPC metadata and the contextual attribute data match one of the one or more access policies.

14. The computing device of claim 12, wherein the processor-executable instructions, when executed by the at least one processor, cause the at least one processor to perform the pre-authorization check by determining, based on the IPC metadata for pre-authorization whether at least one of the calling process and the target process is a pre-authorized process, and to send, after determining that at least one of the calling process and the target process is the pre-authorized process, a permit message indicating that processing of the IPC is permitted.

15. The computing device of claim 12, wherein the processor-executable instructions, when executed by the at least one processor, cause the al least one processor to determine, based on the IPC metadata for pre-authorization whether at least one of the calling process and the target process is a pre-authorized process by determining whether at least one of calling process and the target process comprises a criterion indicating that the at least one of the calling process and the target process is a pre-authorized processes.

16. The computing device of claim 12, wherein the processor-executable instructions, when executed by the at least, one processor, cause the at least one processor to:
    receive an instruction to update one or more access policies; and update, the one or more access policies based on the instruction.

17. The method of claim 1, the determining comprising: determining, by the access control system, whether the IPC is permitted based on whether the IPC type of the IPC in the IPC attribute data is a notification, based on information in the target process attribute data identifying whether the user environment in which the target process runs is the primary profile or the managed user profile, and based on information identifying whether the user environment in which the calling process runs is the primary profile or the managed user profile.

18. The method of claim 1, wherein the contextual attribute data for the operating system is data representative of multiple contextual attributes of the operating system, and wherein at least one contextual attribute of the multiple contextual attributes is information determined from a state of the operating system.

19. The computing device of claim 9, wherein the contextual attribute data for the operating system is data representative of multiple contextual attributes of the operating system, and wherein at least one contextual attribute of the multiple contextual attributes is information determined from a state of the operating system.

* * * * *

UNITED STATES PATENT AND TRADEMARK OFFICE
CERTIFICATE OF CORRECTION

PATENT NO. : 11,062,030 B2  
APPLICATION NO. : 15/916866  
DATED : July 13, 2021  
INVENTOR(S) : Zhang et al.

Page 1 of 1

It is certified that error appears in the above-identified patent and that said Letters Patent is hereby corrected as shown below:

In the Claims

Claim 1, Column 16, Line 53; delete "the" before "IPC"

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*